United States Patent [19]

Goddin, Jr. et al.

[11] 3,758,676
[45] Sept. 11, 1973

[54] METHOD FOR RECOVERY OF ELEMENTAL SULFUR FROM SOUR GAS

[75] Inventors: Clifton S. Goddin, Jr.; Neal R. Montgomery, both of Tulsa, Okla.

[73] Assignee: Amoco Production Company, Tulsa, Okla.

[22] Filed: June 21, 1971

[21] Appl. No.: 155,050

[52] U.S. Cl.............................. 423/573, 423/574
[51] Int. Cl............................................ C01b 17/04
[58] Field of Search .................. 23/225 P; 423/573, 423/576

[56] References Cited
UNITED STATES PATENTS

| | | | |
|---|---|---|---|
| 2,785,056 | 3/1957 | Thumm et al. | 23/225 P |
| 2,767,062 | 10/1956 | Duecker | 23/225 P |

FOREIGN PATENTS OR APPLICATIONS

| | | | |
|---|---|---|---|
| 223,904 | 11/1957 | Australia | 23/225 P |
| 717,483 | 10/1954 | Great Britain | 23/225 P |
| 722,038 | 1/1955 | Great Britain | 23/225 P |
| 651,918 | 12/1962 | Canada | 23/225 P |

*Primary Examiner*—G. O. Peters
*Attorney*—Paul F. Hawley and Arthur McClroy

[57] ABSTRACT

This process takes advantage of the favorable equilibrium that exists for the catalytic reaction of $H_2S$ with $SO_2$ at temperatures of the order of 270° to about 300°F while at the same time offering considerable flexibility in the manner in which the various streams can be handled. Because of the fact that one of the reactors in a multi-reactor plant can always be operated at an effluent temperature of at least 600°F, the process assures good clean up of feed streams containing $CS_2$ and COS. Also, valving and piping are simplified by allowing one reactor to operate as a conventional Claus reactor while the other two reactors operate alternately at temperatures above and below the sulfur dew point.

5 Claims, 1 Drawing Figure

Patented Sept. 11, 1973
3,758,676
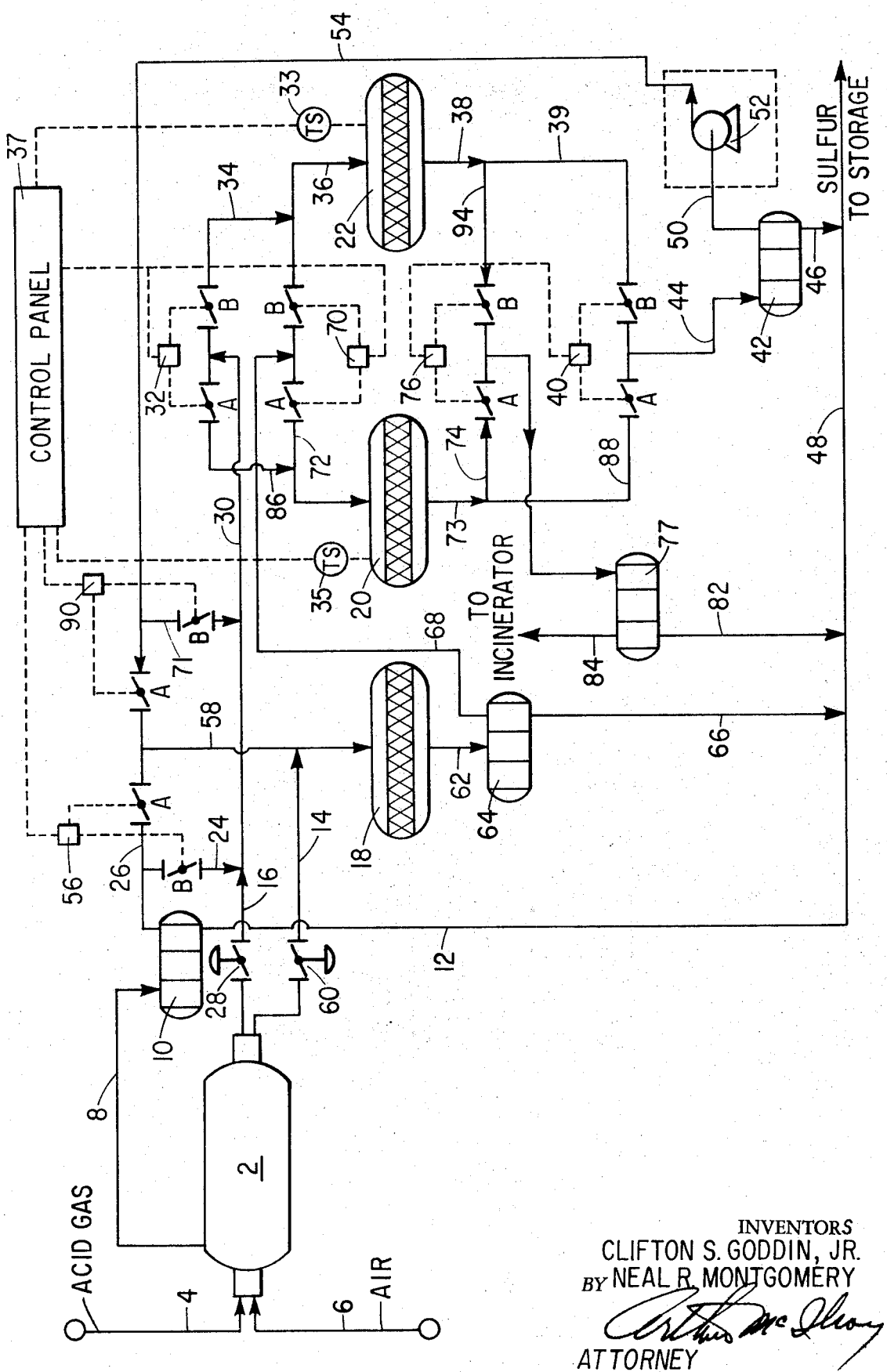

METHOD FOR RECOVERY OF ELEMENTAL SULFUR FROM SOUR GAS

The present invention relates to a method for the production of free sulfur from hydrogen sulfide. More particularly, it is concerned with an improved method for the recovery of free sulfur from sour gas streams by the catalytic conversion of hydrogen sulfide thereto under conditions such that unreacted sulfur compounds discharged to the atmosphere are held to a minimum.

BACKGROUND OF THE INVENTION

Attempts have been made in the past to increase the catalytic conversion of hydrogen sulfide gaseous streams to free sulfur by conducting a portion of the reaction at temperatures below the sulfur dew point in an effort to remove additional sulfur compounds from the stack gases prior to their discharge. To accomplish such an operation required not only many large, expensive valves but also complicated piping arrangements. Other procedures taking advantage of the increased level of conversion of hydrogen sulfide at the lower temperatures have been proposed. However, they employed an inert gas to regenerate catalyst beds that had become relatively unreactive as a result of sulfur deposition. The disadvantage encountered in this procedure was that under the regeneration conditions the reverse Claus reaction occurred, i.e., the free sulfur on the catalyst reacted with water vapor in the regeneration gas to convert the sulfur to hydrogen sulfide and sulfur dioxide, thus lowering the efficiency of the process.

DESCRIPTION OF THE INVENTION

We have now discovered a more simplified process and arrangement of equipment whereby one is able to take advantage of the high hydrogen sulfide conversions characteristic of the "low temperature" conditions, e.g., 270° to 300°F, and at the same time employ not more than two-thirds of the valving required in previous three-reactor plants in which at any given time one reactor is operated under low temperature conditions. Our invention also provides for the operation of one of the reactors under conventional Claus conditions. By this we mean the reactor is operated so that the effluent temperature is at or above the sulfur dew point. Another factor of our process is that at all times one reactor is maintained at an outlet temperature of 600°F or above, thereby tending to reduce to an unobjectionable minimum any $CS_2$ and/or COS present in the system effluent.

Our invention will be further illustrated by reference to the accompanying flow diagram wherein an acid gas feed is introduced into combination furnace and boiler 2 via line 4. Air required for the reaction is added through line 6, mixed with the acid gas and burned in the furnace. A portion of the gases containing hydrogen sulfide, sulfur dioxide and free sulfur, after being cooled in the boiler compartment of vessel 2 to about 550°F, is taken through line 8 to condenser 10 where liquid sulfur is withdrawn via line 12. Bypass reheat gas at about 1,000°F is withdrawn from the boiler sections via lines 14 and 16.

Let us first consider the flow scheme during the portion of the cycle when one of the two low temperature reactors, reactor 22, is being regenerated. Hot regeneration gas for the latter is provided by taking condenser 10 effluent at 350°-375°F via line 26, valve 56-B and line 24 and blending it with 1,000°F bypass reheat gas in line 30 to yield a 450°-700°F regeneration gas. Flow of the reheat gas is set by a temperature controller unit, not shown, operating in conjunction with valve 28. The resulting stream is routed through open valve 32-B and then into reactor 22 through lines 34 and 36. The Claus reaction occurs in reactor 22 under these conditions with generation of additional heat. The sulfur that has been deposited on the catalyst from the previous cleanup cycle is vaporized into the hot gas which flows out through line 38. During the period when the bulk of the vaporization of the sulfur occurs there is very little, if any, temperature increase in the reactor effluent. Temperature changes which indicate the progress of the regeneration in reactor 22 as well as in the cleanup reactor 20 are indicated by temperature probes 33 and 35, respectively, which transmit to the control panel 37. It should also be pointed out that the dual switch valves 56, 90, 32, 70, 76 and 40 are operated from control panel 37.

Completion of the removal of sulfur from the catalyst surface is indicated by a noticeable temperature increase in the reactor effluent. The effluent in lines 38 and 39, which is not at about 600°-700°F, passes through open valve 40-B and from there into condenser 42 via line 44 where the sulfur is formed into a liquid and removed from the system through lines 46 and 48. Condenser 42 effluent at a temperature of about 350°F if taken off through line 50. This condenser is equipped with steam pressure control for two modes of operation, (1) with steam generated at intermediate pressure, i.e., about 70 psia, and outlet temperature controlled to about 350°F during regeneration and initial cooling, and (2) with steam generated at low pressure, i.e., 10-30 psia, giving a condenser outlet temperature of 250°-270°F during final cooling and cleanup period.

It may be desirable to minimize inlet acid gas and air feed pressures to the system by installing a recycle blower 52. However, this expedient is optional. In any event, the relatively cool gas is taken through line 54 via open valve 90A, and blended with 1,000°F reheat gas from line 14 to a temperature of about 450°-500°F and the resulting mixture transferred to reactor 18. Temperature control valve 60 provides a means to regulate the addition of bypass reheat gas. The Claus reaction occurs in reactor 18, and product gas above the sulfur dew point is withdrawn through line 62 to condenser 64, with sulfur being removed therefrom in liquid form through line 66 and then to storage via line 48. The condenser effluent at about 270°F, is transferred through line 68 via open valve 70-A and line 72 to reactor 20, operating in this phase of the cycle as a low temperature cleanup reactor. The effluent from reactor 20 while the latter is operating in the cleanup position is withdrawn through lines 73 and 74, through open valve 76-A and conducted to final condenser 77 via line 78 where the sulfur vapor present is converted to liquid form and withdrawn from the system via lines 82 and 48. Tail gas from condenser 77, which is now substantially free of sulfur and compounds thereof, is sent to an incinerator (not shown) by means of line 84.

When the regeneration outlet temperature in line 38 has been sustained at 600°-700°F for the requisite time, "initial cooling" of the hot bed is started by reducing or cutting off the reheat gas flow in line 16 so that the feed temperature to reactor 22 drops to 350° to 450°F.

Flow is then continued for 1 to 2 hours, until the outlet temperature in line 38 falls to about 500°–550°F. At this point, valves 56, 90, 32 and 70 are reversed and the steam pressure in condenser 42 is reduced. This phase of the cycle is designated as the "final cooling" period. The entire effluent from condenser 10 now is diverted into reactor 18 via lines 26 and 58. The temperature of the feed line 58 is regulated by the use of reheat gas in line 14. The reactor inlet temperature of this gas is preferably about 450°F; however, when $CS_2$ and COS are present in amounts in excess of about 0.1 percent based on the sulfur content of the feed, it is desirable to maintain a feed inlet temperature such that the reactor outlet temperature is at 600°F or above to assure substantially complete conversion of these compounds into free sulfur. Effluent from condenser 64 at 250°–270°F is then sent to freshly regenerated reactor 22 via line 68 and valve 70-B and line 36. The effluent from reactor 22 is taken through condenser 42 where liquid sulfur is separated and withdrawn from the system via lines 46 and 48. Condenser 42 effluent is taken through lines 54, 71, valve 90-B, line 30, valves 32-A, line 86 and line 72 into reactor 20. Effluent from reactor 20 is sent to condenser 77 where liquid sulfur is removed therefrom and the uncondensed portion is taken from the system via line 84. Cooling of the catalyst bed continues until an effluent temperature from reactor 22 of about 350°–400°F is approached.

When the final cooling period is completed, valves 32, 70, 76 and 40 are switched, resulting in freshly regenerated and cooled reactor 22 being placed in the final cleanup position. In this portion of the cycle, which is designated as "cleanup," the conditions and flow through reactor 18 are the same as described for the preceding final cooling period. The effluent from condenser 64 now flows to reactor 20 via line 68, valve 70-A and line 72. Reactor 20 effluent is sent to condenser 42 through lines 73 and 88, valve 40-A and line 44. The uncondensed portion flowing through condenser 42 is taken to reactor 22 through lines 50, 54, 71, valve 90-B, line 30, valve 32-B and lines 34 and 36. The effluent from reactor 22 is transferred to final condenser 77 by means of lines 38, 94, valve 76-B and line 78. During this period the gas flows through two low temperature reactors in series and the conversion is at a very high level. This high recovery operation is continued until the sulfur buildup on the catalyst in reactor 20 is such that regeneration is required (evidenced by a decline in reactor outlet temperature), after which the above-described cycle sequence is repeated, with the roles of reactors 20 and 22 reversed.

Typically, for a specific "low temperature" reactor the regeneration portion of the cycle requires about 7 hours, initial cooling about 1 hour and final cooling about 2 hours. The reactor then remains in "low temperature" service for about 14 hours. Thus, for a plant having two "low temperature" reactors the complete cycle time for one reactor is 24 hours.

The flow system disclosed herein presents an advantageous combination of features over the prior art, viz., the principle of using condenser 10 effluent, mixed with 1,000°F gas from waste heat boiler 2, for regeneration as opposed to hot inert recycle gas for this purpose, and the valve simplification resulting from allowing the "low temperature" cleanup reaction to swing only between reactors 20 and 22, with reactor 18 operating as a conventional Claus reactor, with effluent temperature at or above the sulfur dew point.

Considerable flexibility exists in the selection of feed temperature to Claus reactor 18. The optimum temperature depends to a large degree on the production of COS and $CS_2$ in the furnace which in turn is influenced by the acid gas composition, especially hydrocarbon content. When the loss of sulfur via these compounds is high, it is desirable to increase the temperature level (to 600°F or higher) within a subsequent Claus reactor to promote decomposition of these materials. Since high temperature results in less favorable Claus conversion, the optimal reaction temperature is that which gives maximum overall plant sulfur recovery.

During the period when reactor 18 (the Claus reactor) is taking all the effluent from condenser 10 via line 26, i.e., during final cooling and cleanup periods, the temperature of the feed to reactor 18 is held high enough, e.g., 450°F or above, so that the adiabatic reaction mixture is at 600°F or above, substantially higher than the sulfur dew point. However, during the regeneration period, when all of the effluent from condenser 10 flows to either reactor 20 or 22, and when the regeneration effluent temperature has risen to 600°F or higher, then it is desirable to optimize sulfur recovery by reducing the temperature of the feed to reactor 18 (by reducing or cutting off flow of reheat gas) so that the effluent from this reactor will be only slightly above the sulfur dew point. In selecting a temperature schedule, the prime consideration is that at all times one reactor within the system is maintained with an outlet of 600°F or above. When the reheat gas to the reactor undergoing regeneration is shut off to initiate cooling, it can be diverted to start heating the feed to Claus reactor 18 in preparation for the reactor switch (diversion of all condenser 10 effluent to reactor 18) at the start of final cooling, as mentioned above. To ensure complete conversion of COS and $CS_2$ within reactor 18 during the time it is taking the entire effluent from condenser 10, a higher inlet temperature, e.g., 450°–550°F, is desired. The flexibility which exists in control of these temperature conditions makes it possible to maximize overall system sulfur recovery.

The process of our invention also contemplates modifying the above-described procedure in a way such that during that portion of the regeneration period when the effluent from reactor 20 or 22 is above 600°F, the Claus reactor (18) can be operated under conditions which permit some deposition of sulfur on the catalyst. In this way the sulfur recovery can be further increased owing to the more favorable equilibrium conversion at lower temperature in the Claus reactor.

The procedure described above includes the following advantages: (1) Isolation of a reactor during regeneration is avoided, i.e., three reactors always are onstream, with resultant lower peak and average sulfur emission losses; (2) the valving and piping are simplified by allowing reactor 18 to operate only as a Claus reactor, followed by reactors 20 and 22 operating alternately at temperatures above and below the sulfur dew point; and (3) provides a means by which we can maintain at all times within one reactor of the system a temperature level high enough, typically 600°–700°F, to decompose sulfur compounds such as COS and $CS_2$ which are formed in the furnace, thereby reducing sulfur loss.

We claim:

1. In a process for the catalytic conversion of a gaseous stream containing hydrogen sulfide wherein said stream is subjected to an oxidation step to produce a reaction mixture in which the hydrogen sulfide and sulfur dioxide are present in a molar ratio of about 2:1, the improvement comprising the following steps:
   1. passing said reaction mixture at an inlet temperature of from about 450° to about 550°F through a first catalytic reaction zone having sulfur deposited on the catalyst whereby said sulfur is removed therefrom in vapor form;
   2. simultaneously with removal of said sulfur, reacting the $H_2S$ and $SO_2$ in said reaction mixture in said first zone with the generation of additional heat used to aid in vaporizing said deposited sulfur;
   3. withdrawing a mixture of sulfur and unreacted $H_2S$ and $SO_2$ from said first zone, separating the produced sulfur therefrom and introducing the resulting sulfur-denuded mixture into a second catalytic reaction zone at an inlet temperature of about 300° to about 550°F to form additional sulfur;
   4. withdrawing product sulfur and a mixture of unreacted $H_2S$ and $SO_2$ from said second zone, separating sulfur therefrom and introducing said mixture of unreacted $H_2S$ and $SO_2$ at a temperature of from about 270° to about 300°F into a third catalyst bed;
   5. continuing step 1 until the temperature of the effluent from said first zone increases to from about 600° to about 700°F;
   6. thereafter lowering the inlet temperature of the feed to said first zone until the temperature of the effluent therefrom decreases to from about 500° to about 550°F;
   7. diverting the flow of the reaction mixture in step 1 to said second zone, taking the sulfur-denuded effluent from the latter and introducing it at a temperature of from about 250° to about 270°F into the freshly regenerated first zone;
   8. continuing step 7 until the effluent from said first zone approaches a temperature of from about 350° to about 400°F; and
   thereafter repeating the above cycle with the positions of the first and third catalyst zones being reversed.

2. The method of claim 1 in which the inlet temperature of said vaporous mixture introduced into said second bed is in the range of from about 450°–550°F.

3. The method of claim 1 in which said reaction mixture contains an objectionable amount of $CS_2$ and COS.

4. The method of claim 3 wherein the conditions maintained in said second bed are such that the effluent therefrom contains not more than about 0.1 percent $CS_2$ and COS, based on the sulfur content of said gaseous stream.

5. The process of claim 1 modified to the extent that when the effluent from said first catalyst bed reaches a temperature of about 600°F the feed to said second catalyst bed is reduced in temperature to a level below the dew point of the sulfur vapor produced therein.

* * * * *